United States Patent [19]
Barrett

[11] 4,362,053
[45] Dec. 7, 1982

[54] APPARATUS FOR MEASURING PARKING BRAKE ACTIVATING FORCES

[75] Inventor: Gary L. Barrett, Union Lake, Mich.

[73] Assignee: GSE, Inc., Farmington Hills, Mich.

[21] Appl. No.: 241,912

[22] Filed: Mar. 9, 1981

[51] Int. Cl.³ .............................................. G01L 5/28
[52] U.S. Cl. ...................................... 73/121; 73/132; 340/52 B
[58] Field of Search ................ 73/132, 862.38, 862.51, 73/862.52, 862.53, 862.54, 862.62, 862.64, 862.65, 862.66, 862.67, 862.21, 862.26, 121; 340/52 B, 69, 665

[56] References Cited
U.S. PATENT DOCUMENTS

| 2,250,941 | 7/1941 | Zimmerman | 340/665 X |
| 3,587,307 | 6/1971 | Newberg | 73/862.21 |
| 3,970,155 | 7/1976 | Otto | 73/862.26 |

*Primary Examiner*—Jerry W. Myracle
*Attorney, Agent, or Firm*—Krass, Young & Schivley

[57] ABSTRACT

Apparatus for sensing the force necessary to pull the lever arm of an automobile parking brake to a predetermined position. An elongated body includes a cavity for receiving the lever arm of the parking brake assembly. The body includes a switch arranged to come into contact with portions of the parking brake assembly when the lever arm is lifted to a predetermined position. A transducer is operative to measure the amount of force required to lift the lever arm to the position at which the switch contacts the parking brake assembly.

21 Claims, 6 Drawing Figures

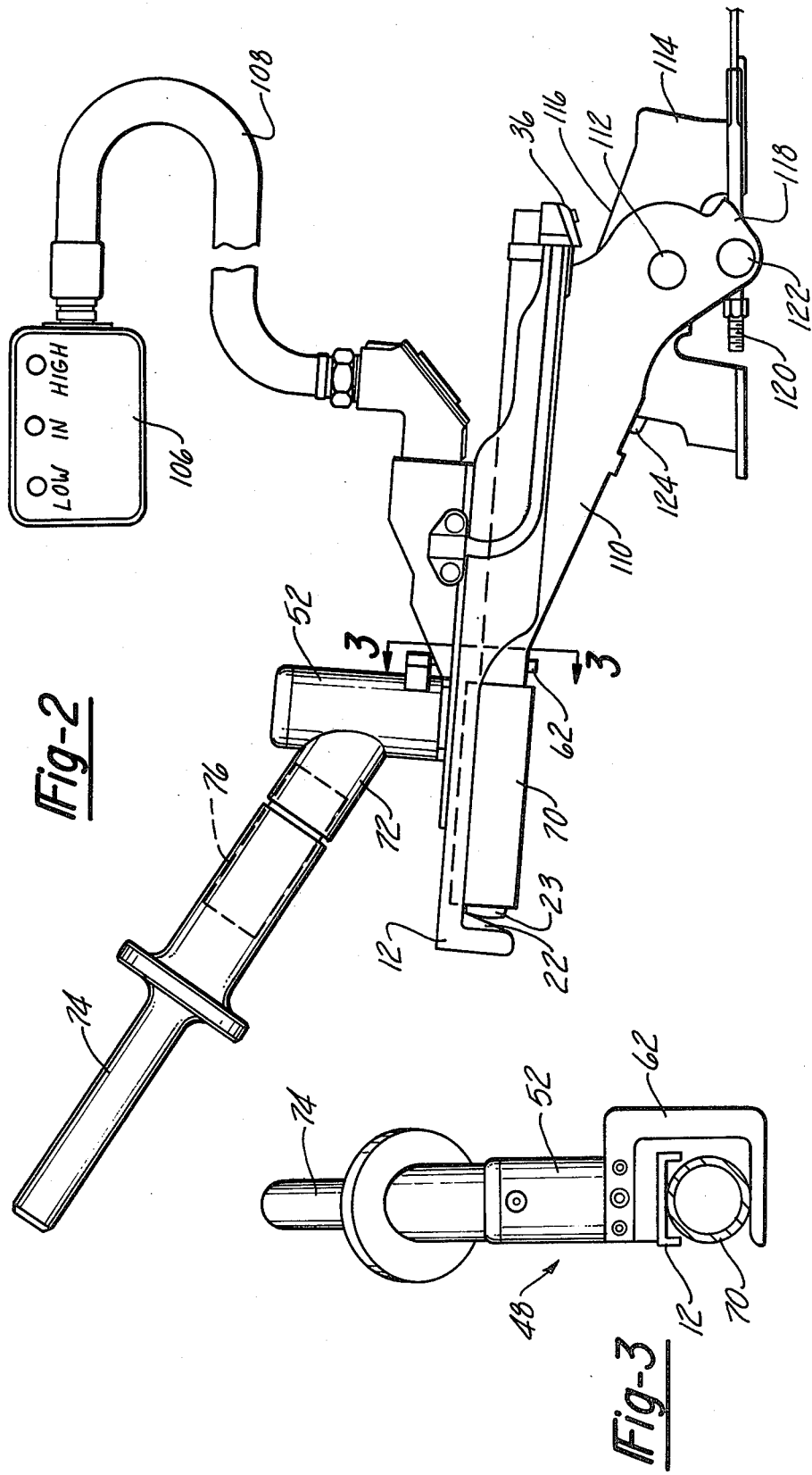

APPARATUS FOR MEASURING PARKING BRAKE ACTIVATING FORCES

CROSS REFERENCE TO RELATED APPLICATIONS

This application is related to concurrently filed U.S. Ser. No. 242,095, filed Mar. 9, 1981, to Barrett entitled "Method and Apparatus For Measuring Cable Tension in a Parking Brake Assembly", having the same assignee as the present invention.

BACKGROUND OF THE INVENTION

This invention relates to force measuring transducer devices. More particularly, it involves apparatus for sensing the amount of force required to pull up a lever arm in an automobile parking brake assembly.

In the manufacture of automobiles and other vehicles using parking brake assemblies it is desirable for the assembly to be adjusted such that a certain amount of force is required to engage the parking brake. For example, some typical specifications set 50-60 pounds as the force necessary to raise the parking brake lever arm to a predetermined position on the ratchet structure commonly found in those parking brake assemblies mounted on the control console between the car seats.

In those vehicular constructions in which the parking brake cable is exposed underneath the car, the above specification can be measured by sensing the tension in the cable. However, in some constructions the parking brake cable is run through a conduit underneath the car such that it is impossible for quality control or service personnel to gain access to the cable to conduct such a measurement. The use of mechanical force gauges may be employed to conduct such measurements where limited access to the cable is encountered. These force gauges resemble fish scales in that they utilize a hook and a spring-loaded indicator device to measure the load. The hook may be placed around the parking brake and the test apparatus lifted to pull the lever arm to a given position at which time the reading of the indicator is taken. Unfortunately, this approach tends to be inaccuate, cumbersome to use, and does not lend itself to high volume production work.

SUMMARY OF THE INVENTION

According to the teachings of the present invention a test fixture is provided for measuring the amount of force required to move a load-bearing lever arm to a given position. The fixture includes a body adapted to receive and hold the lever arm. Transducer means coupled to the body is provided for measuring the amount of force required to move the lever arm. A switching device is arranged to provide an output signal when the lever arm has been moved to a predetermined position. The output signal from the switch is used to trigger a reading of the transducer which provides an indication of the force required to move the lever arm to the predetermined position.

In a preferred embodiment the test fixture takes the form of an elongated body having a cavity adapted to receive the lever arm of a parking brake assembly. A rotatable turret on the body includes a hook depending therefrom which is adapted to engage the lever arm to hold it in the cavity. The transducer is supplied by way of a flexure beam mounted between the turret and a handle to which the lever arm moving force is applied. The longitudinal axis of the handle is arranged so that it passes through the pivot point of the parking brake assembly. In such manner uniform readings may be taken without undue concern over the angle to which the force is applied to the handle.

BRIEF DESCRIPTION OF THE DRAWINGS

These and other advantages of the present invention will become apparent upon reading the following specification and by reference to the drawings in which:

FIG. 2 is a side view showing the test fixture connected to a parking brake assembly;

FIG. 3 is a partial cross sectional view along lines 3—3 of FIG. 2;

DESCRIPTION OF THE PREFERRED EMBODIMENT

Figure 1:
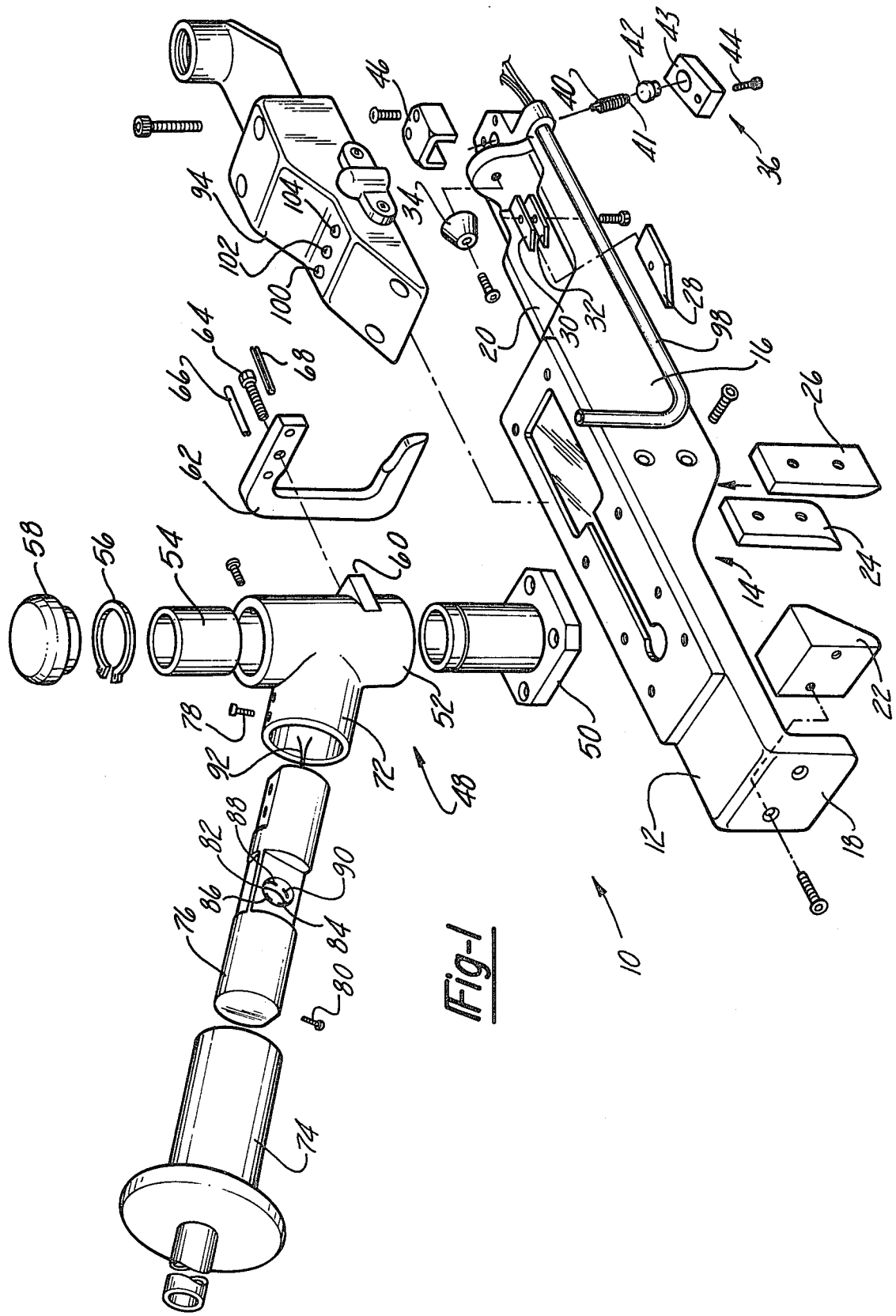
FIG. 1 is an exploded perspective view of the test fixture of the preferred embodiment.

Turning now to the drawings, especially FIG. 1, the test fixture of the preferred embodiment of the invention is generally designated by the numeral 10. An elongated rigid body 12 includes a cavity 14 adapted to receive the lever arm of the parking brake assembly. Cavity 14 is defined by downwardly projecting flanges 16, 18 and 20. Provision is made in cavity 14 to provide relatively close nesting of the parking brake lever arm. In the preferred embodiment this is accomplished by way of pad 22 in the nose; spacers 24, 26 along the sides; and an opposing pair (only one shown) of horizontal spacers 28 sandwiched between flanges 30, 32. Pad 22 is designed to press down on the button 23 to disengage the pawl in the ratchet portion of the parking brake assembly when the lever arm has been nested in cavity 14 for purposes which will become apparent later herein. A cone 34 mounted on an upstanding portion of body 12 serves as a stop for the lower end of the parking brake lever arm. It should be appreciated that the undercarriage of the fixture is specifically designed for a particular configuration of parking brake lever arm and that obvious modifications will be necessary to make it compatible with different configurations.

A spring-loaded limit switch assembly 36 is mounted on the underside of a horizontally extending projection 38 of body 12. As can be seen most clearly in FIGS. 2 and 4, the underside of switch 36 is angled such that the face of the limit switch becomes generally parallel with the upper inclined surface of the parking brake bracket when the lever arm has been raised to a given position. As will be discussed more fully herein, the purpose of limit switch 36 is to come into contact with portions of the parking brake assembly when the lever arm has been raised to a given position. Limit switch assembly 36 employs a conventional spring-loaded device 40 having a plunger 41 engaging a wear button 42 which is slidingly mounted in a cover 43. Device 40 may be threaded into an opening 45 in projection 38, with the cover 43 being secured to the underside thereof by screws 44.

A rotating turret 48 is mounted on the upper surface of body 12. The major longitudinal axis of turret 48 is generally normal to that of the body 12. Turret 48 includes a pin 50 on which a tubular pivot member 52 is rotatably mounted. Upper portions of member 52 are adapted to receive tubular insert 54, snap ring 56, and cap 58.

Figure 5:
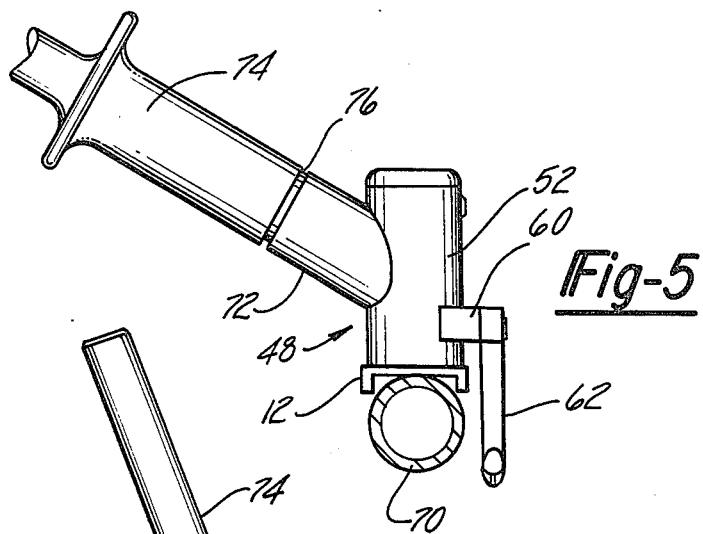
FIG. 5 is a view similar to FIG. 3 showing the handle of the test fixture in a rotated position.

One side of pivot member 52 includes a lip 60 having a flat major face which serves as a mounting surface for a C-shaped hook 62. Hook 62 is affixed to lip 60 by way of cap screw 64 and roll pins 66, 68. Hook 62 is chosen such that it will press against the underside of the parking brake lever arm 70 to hold it rigidly within the cavity of body 12 when turret 48 is in the position shown in FIG. 3. When turret 48 is rotated to the position shown in FIG. 5, hook 62 swings away from lever arm 70 to permit fixture 10 to be lifted therefrom.

Returning emphasis to FIG. 1, pivot member 52 includes a tubular portion 72 which is rigidly connected at about a 45° angle to the major longitudinal axis of pivot member 52. A handle 74 with a hollowed out end portion serves to provide a gripping projection at its opposite end which may be readily grasped by the user.

A solid rod of machined steel serves as a flexure beam transducer 76. Beam 76 is rigidly mounted between handle 74 and portion 72. Conveniently, this is provided by way of drilled holes in flats on opposite ends of beam 76 which receive screws 78 and 80 passing through portion 72 and handle 74, respectively. Beam 76 includes a mid-section of reduced cross-sectional area through which an opening 82 has been drilled. Mounted on the inner surface of opening 82 are four strain gauges 84, 86, 88 and 90. As is known in the art, strain gauges 84–90 provide variable resistance characteristics depending upon the strain exerted on beam 76. With additional reference to FIGS. 2 and 4, it can be seen that when an upward lifting force is exerted on handle 74, the beam 76 is flexed. Note that the end surfaces of handle 74 and portion 72 are spaced a small distance from each other to prevent these surfaces from binding to insure that beam 76 is flexed when a force is exerted on handle 74.

Electrical connection to strain gauges 84–90 is provided by way of wires 92 which are fed through turret 48 and into a connector block 94 which is mounted on the upper surface of body 12. Wires 96 connected to limit switch assembly 36 are fed through conduit 98 to connector block 94. Connector block 94 includes three light emitting diodes (LEDs) 100, 102 and 104 which provide low, in range, and high force visual signals as will later be discussed. Suitable electrical connection between fixture 10 and control circuitry 106 is provided by way of cable 108.

In operation, test fixture 10 is clamped onto the lever arm 70 of the parking brake as shown in FIGS. 2 and 3. Handle 74 is first swiveled to the position shown in FIG. 5 such that lever arm 70 may become nested in the cavity 14 of body 12 free from interference with hook 62. After the lever arm 70 has been nested in body 12, handle 74 of the test fixture is rotated to bring lower portions of hook 62 into contact with lower portions of lever arm 70 to rigidly secure it to test fixture 10.

Figure 4:
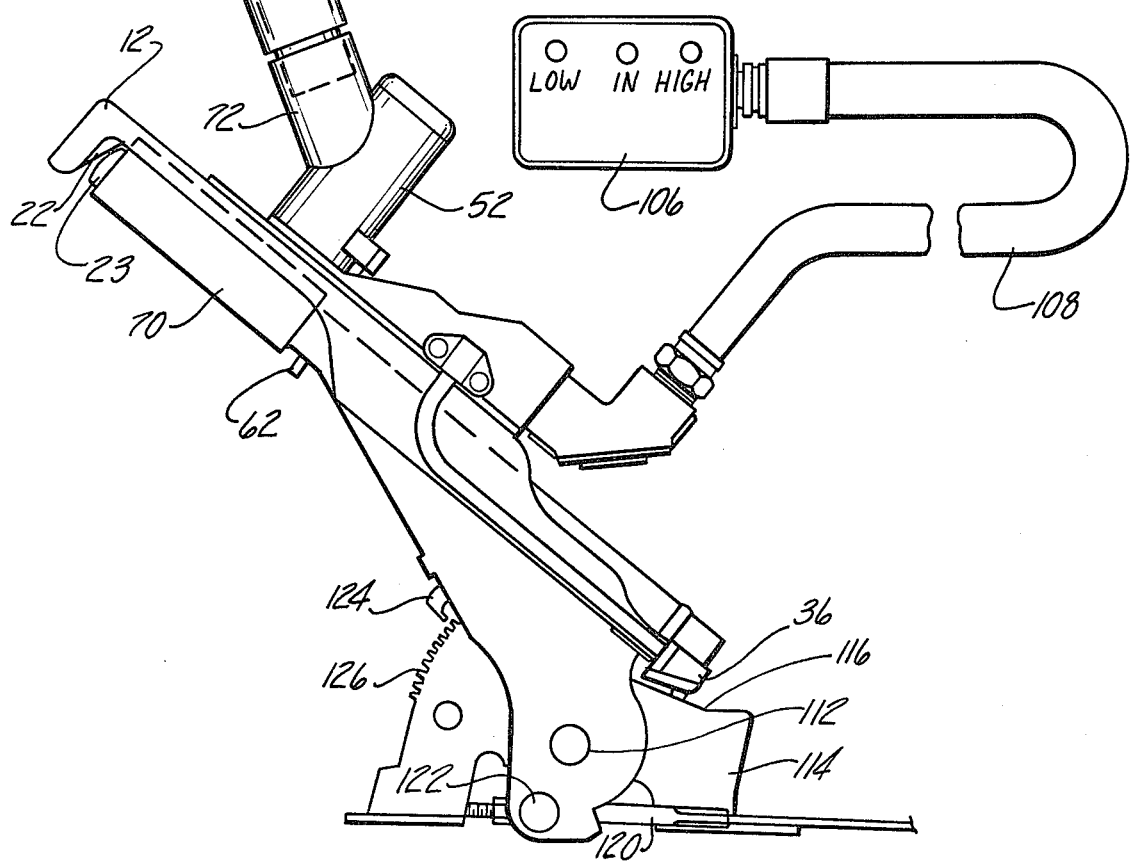
FIG. 4 is a side view similar to FIG. 2 showing the parking brake in a raised position.

The parking brake assembly as shown in FIGS. 2 and 4 typically includes a pair of flanges 110 which are connected at their upper ends to lever arm 70. The lower ends of flanges 110 are pivoted about a pin 112 passing through a base bracket 114. Base bracket 114 is typically mounted on the automobile console and includes an inclined upper surface 116. A lower portion of flange 110 extending beyond pivot point 112 is coupled to a cable 120 by way of a suitable connecting rod 122. Cable 120 as is known in the art is coupled to the rear brakes of an automobile. When lever arm 70 is raised, the pivoting action of flange portion 118 creates tension on cable 120 to engage the brakes. Conventionally, the parking brake assembly includes a ratchet with a pawl 124 which normally engages teeth 126 on the front portions of bracket 114 (see FIG. 4).

Figure 6:
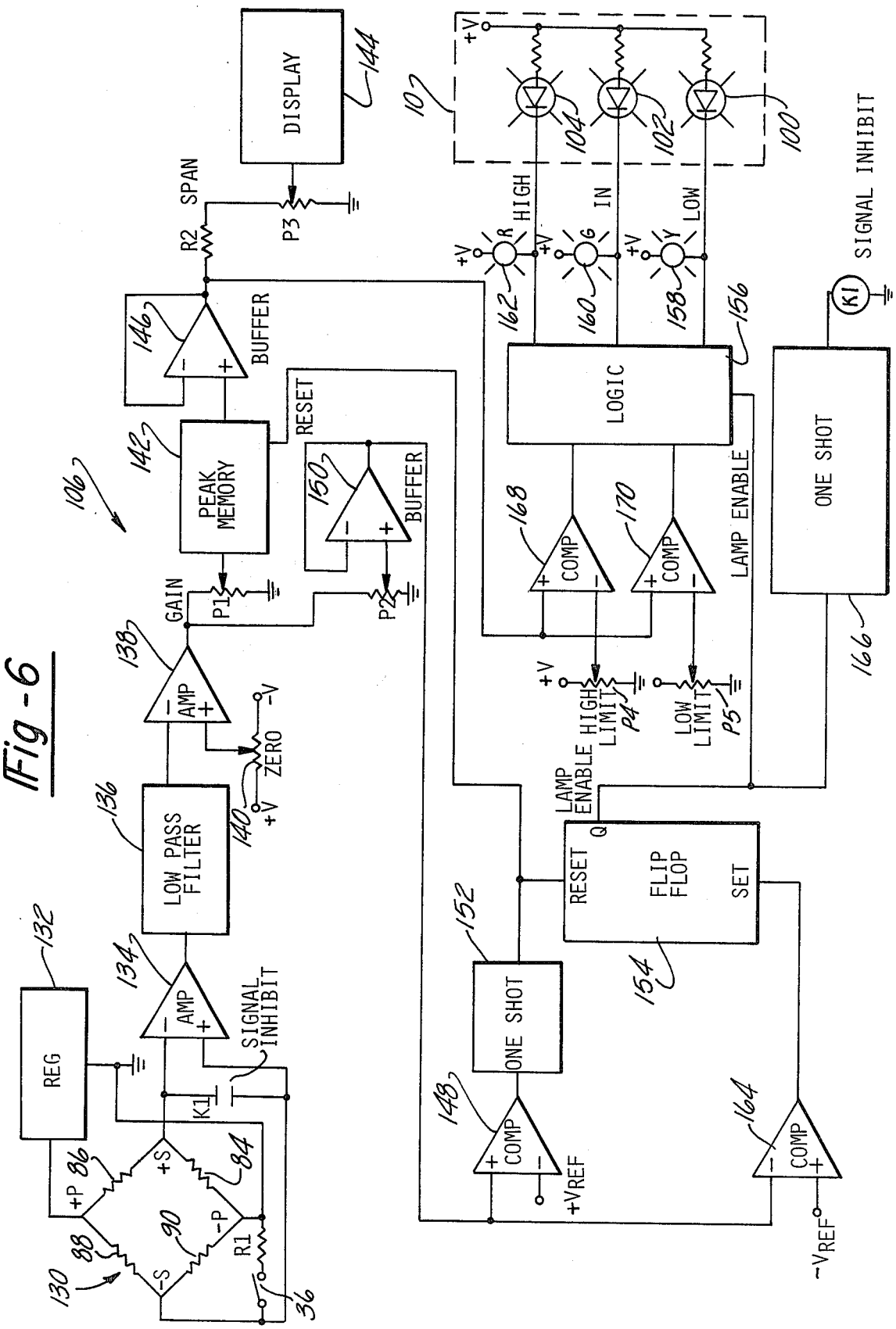
FIG. 6 is a circuit diagram of the transducer control circuitry of the preferred embodiment.

Once test fixture 10 has been clamped onto lever arm 70, the user lifts up on handle 74 to begin raising lever arm 70. As noted above, pad 22 of fixture 10 presses down on lever arm button 23 to prevent pawl 124 from engaging teeth 126 during the test. The amount of force applied to handle 74 is detected by the strain gauges 84–90 on beam 76. Referring to FIG. 6, strain gauges 84–90 are connected into a conventional Wheatstone bridge circuit 130 in control circuitry 106. When the beam 76 is in an unstressed condition the output of the bridge is adjusted to zero. When force is exerted on handle 74 the resulting strain on beam 76 serves to unbalance the bridge to provide an analog output signal which is proportional to the amount of force applied to handle 74.

Control circuitry 106 includes a regulated power supply 132 coupled to bridge 130. The outputs (+S, −S) of bridge 130 are connected to the inverting and noninverting inputs of amplifier 134, respectively. Amplifier 134 serves to amplify the difference between its inputs. The output of amplifier 134 is connected to a low pass filter 136 whose output is, in turn, connected to the inverting input of amplifier 138. The noninverting input of amplifier 138 is connected to a voltage divider network 140 which serves to zero the output of amplifier 138 during calibration of the test fixture 10. The output of amplifier 138 thus is an analog signal which is proportional to the force exerted on handle 74 of test fixture 10 during the testing procedure. The output of amplifier 138 is connected to a peak memory 142 through a gain adjusting potentiometer P1. The output of peak memory 142 is connected to a display device 144 through buffer 146, resistor R2, and potentiometer P3.

The output of amplifier 138 is also coupled to the noninverting input of comparator 148 through potentiometer P2 and buffer 150. When the force exerted on test fixture 10 exceeds a threshold level determined by a selected value ($+V_{ref}$), comparator 148 will energize a one shot multivibrator 152. The pulse generated from multivibrator 152 simultaneously rests peak memory 142 to an initialized state and, further, resets lamp enabling flip flop 154. The Q output of flip flop 154 serves to disable the lamp logic network 156. The disabled state of logic 156 serves to deenergize all of the lamps connected to its outputs. In the preferred embodiment, the box containing control circuitry 106 includes low lamp 158, in lamp 160, and high lamp 162 which corresponds with lamps 100, 102, and 104, respectively, which are located on test fixture 10. Thus, all of the indicating lamps will be turned off once the user begins the test thereby providing an indication that the control circuitry is functional.

As the user continues to pull up on handle 74 the force is continued to be monitored and stored by peak memory 142 such that the maximum amount of the applied force is shown on display 144.

The user continues to lift on handle 74 until the switch 36 on fixture 10 engages bracket 114 as can be seen most clearly in FIG. 4. The activation of switch 36 serves to couple the negative power supply voltage from regulator 132 to one of the outputs of the bridge 130 as can be seen in FIG. 6. This negative voltage causes the output of amplifier 134 to go negative, a reversal of its normal polarity which is positive during previous portions of the test. When the resultant signal level exceeds a negative reference ($-V_{ref}$) connected to the noninverting input of comparator 164, the lamp enable flip flop 154 is set. The Q output of flip flop 154 triggers a one shot multivibrator 166 which in turn closes relay K1 coupled between the inputs to amplifier 134. Relay K1 thereby shorts together the outputs of the bridge thereby inhibiting any further signal generation.

The Q output of flip flop 154 also serves to enable lamp logic 156. The contents of peak memory 142 are compared by a pair of comparators 168 and 170 to preset high and low limits generated by potentiometers P4 and P5, respectively. If the transducer portion of the test fixture has detected forces which are too high or too low, logic 156 will energize the high (104, 162) or low (100, 158) lamps connected to its outputs. If, however, the detected force falls within range, logic 156 will energize the in lamp (102, 160) to thereby indicate that the appropriate parameters have been met and that the parking brake assembly has been appropriately adjusted.

Attention should be drawn to the fact that in the preferred embodiment the major longitudinal axis of handle 74 passes through the center of the pivot point 112 of the parking brake assembly. Such a construction minimizes the criticality of the angle of force applied to handle 74. The force desired to be measured in this application is the amount of force applied normal to the handle 74 necessary to lift the parking brake lever arm 70 to the given position. By constructing the fixture such that the longitudinal axis of handle 74 passes through the center line of the pivot point 112, extraneous moments which otherwise could affect the accuracy of the measurement are eliminated. Therefore, any force vectors extending parallel to handle 74 will not create any deleterious moments which could affect the standardization and consistent accuracy of the testing procedure. Accordingly, the user need not be overly concerned with pulling handle 74 in a direction exactly normal to its axis since the ultimate measurement will only be a function of the normally applied force. In automotive quality control departments where many such measurements must be taken, the ease of use supplied by the present invention, its ruggedness, and consistent measurements are very advantageous features.

In summary, the user clamps the test fixture 10 to the pivot arm 70 as shown in FIG. 2. He then pulls up on handle 74 until the indicator lamps 100 ∝ 104 undergo an off/on transition at which time he ceases to apply further force. Even if there is a certain amount of overshoot, the cooperation of limit switch 36 with the electronic control circuitry 106 serves to provide an accurate reading of the peak force required to pull up on the parking brake lever arm until it reaches a given position at which time switch 36 contacts bracket 114. If the in indicator lamp 102 is then lit, the user knows that the particular unit has been adjusted properly. If the high 104 or low 100 lamps are lit certain corrective measures can be made. For example, the nut on the cable 120 may be adjusted to loosen or tighten the tension on the cable. Thus, this diagnostic procedure can be carried out entirely within the open confines of the automobile interior after final assembly of the automobile in which the cable is otherwise inaccessable. It should be noted that while this invention has been described in connection the use of a console mounted parking brake in an automobile, other applications of the test fixture will become apparent to one skilled in the art. For example, it is envisioned that the central concept employed herein would be equally applicable for foot actuated parking brakes or the like. In fact, the present invention may find utility in a wide variety of diverse applications in which a measurement of the amount of force required to move a lever arm to a given position is desirous. Therefore, while this invention has been described in connection with a particular embodiment thereof, no limitation is intended thereby as certain other modifications will become apparent to one skilled in the art upon a study of the drawings, specification, and following claims.

I claim:

1. A test fixture for measuring the amount of force required to move a lever arm to a predetermined position, said test fixture comprising:
   a body adapted to be clamped to the lever arm;
   transducer means carried by the body for measuring the amount of force exerted on the body during movement; and
   switch means arranged to be actuated when the lever arm has been moved to a predetermined position whereby the output of the transducer means at the time of switch activation provides a measurement of the force required to move the lever arm to the predetermined position.

2. The test fixture of claim 1 which further comprises:
   a rotatable turret on the body including a hook depending therefrom adapted to engage the lever arm to clamp it onto the body.

3. The test fixture of claim 1 which further comprises:
   a handle; and
   a flexure beam connected between the handle and the body, operative to provide an output signal representative of the applied force to the handle.

4. The test fixture of claim 3 wherein the longitudinal axis of the handle passes through the pivot point of the lever arm.

5. The test fixture of claim 4 which further comprises:
   a plurality of strain gauges on said beam connected into a bridge circuit, operative to provide an output signal proportional to the strain created in the beam.

6. The test fixture of claim 5 wherein said switch means is coupled to said bridge circuit, operative to provide a detectable change in the output of the bridge circuit when the switch is actuated.

7. Apparatus for measuring the amount of force required to move a lever arm in a parking brake assembly to a predetermined position, said apparatus comprising:
   an elongated body adapted to receive a lever arm of the parking brake;
   clamping means for holding the lever arm rigidly on the body;
   a handle;
   transducer means for measuring the amount of force exerted on the handle during movement of the lever arm;
   switch means on one end of the body arranged for contacting portions of the parking brake assembly when the lever arm has been raised to a predetermined position; and means for detecting the output of the transducer when the switch has contacted the parking brake assembly to provide an automatic readout of the force necessary to move the lever arm to said predetermined position.

8. The apparatus of claim 7 which further comprises:
a rotatable turret on the body including a hook depending therefrom adapted to engage the lever arm to secure it to the body.

9. The apparatus of claim 8 wherein said transducer means comprises a flexure beam whose opposite ends are connected to said handle and said turret.

10. The apparatus of claim 9 wherein said flexure beam includes a plurality of strain gauges connected into a bridge circuit, operative to provide an output signal representative of the strain created in the beam when force is exerted on said handle.

11. The apparatus of claim 10 wherein said switch means is coupled to said bridge circuit, operative to modify the output of the bridge circuit when the lever arm has been raised to a position at which the switch is contacted.

12. The apparatus of claim 11 which further comprises:
memory means for storing the peak output signal from said transducer;
a plurality of indicator lamps; and
control means coupled to the bridge circuit, operative to selectively energize said lamps as a function of the outputs from the bridge and memory means.

13. The apparatus of claim 7 wherein said handle is arranged such that its longitudinal axis passes through the pivot point of the parking brake assembly.

14. Apparatus for testing the amount of force required to lift a lever arm in an automobile parking brake assembly to a predetermined position, said apparatus comprising:
an elongated body having a cavity adapted to receive the lever arm;
a rotatable turret mounted on the body opposite said cavity;
a hook depending from the turret adapted to selectively engage the lever arm to hold it in the cavity;
said turret having a tubular portion extending at an angle therefrom;
a handle having a hollowed out end portion;
a strain gauge flexure beam having opposite ends connected to said tubular portion and said handle;
said handle, flexure beam, and tubular portion being arranged along a common axis that passes through the pivot point of the parking brake assembly; and
switch means carried on one end of the body arranged to contact portions of the parking brake assembly when sufficient force has been exerted on the handle to raise the lever arm to a given position.

15. The apparatus of claim 14 wherein said strain gauges are connected into a bridge network, operative to provide an analog output signal as a function of the force exerted on the handle.

16. The apparatus of claim 15 which further includes:
memory means for storing the peak output of the bridge; and
means for inhibiting the bridge output when the switch contacts the parking brake assembly whereby the contents of said memory means provides an indication of the amount of force required to lift the parking brake lever arm to said given position.

17. The apparatus of claim 16 wherein said switch means is operative to impress a negative voltage signal on the output of the bridge when said switch is actuated; and wherein said apparatus further comprises:
comparison means for comparing the output of the bridge with a negative reference level, operative to initiate a comparison of the memory contents with preset limits when the output of the bridge becomes more negative than the negative reference level.

18. The apparatus of claim 16 which further comprises:
a high indicator lamp;
a low indicator lamp;
an in range indicator lamp; and
logic means for comparing the output of the memory means with preset limit values, operative to selectively activate said indicator lamps depending upon the comparison.

19. The apparatus of claim 18 which further comprises:
means for deactivating said indicator lamps when the output from the bridge exceeds a predetermined level; and
means for reactivating at least one of said indicator lamps when said switch is contacted.

20. The apparatus of claim 19 wherein said switch means is mounted at an angle with respect to the major longitudinal access of the body, operative to generally parallel said portions of the parking brake assembly when the lever arm has been raised to the given position.

21. A method of measuring the amount of force required to lift a lever arm in a parking brake assembly to a given position; said method comprising:
securing a test fixture to the lever arm;
lifting the test fixture to move the lever arm;
measuring the strain developed in the test fixture;
storing the peak strain developed in a memory;
deenergizing a plurality of indicator lamps when the strain exceeds a given threshold level;
continuing the lifting of the test fixture until a portion thereof contacts a surface of the parking brake assembly;
inhibiting further measurement of the strain in the test fixture;
comparing the contents of the memory with preset limit values; and
selectively energizing one of the indicator lamps as a function of the comparison.

* * * * *